United States Patent [19]

Walker

[11] 4,430,222

[45] Feb. 7, 1984

[54] WATER SHEDDING DEVICE

[76] Inventor: Richard E. Walker, 237 Charleston St., Cadiz, Ohio 43907

[21] Appl. No.: 424,845

[22] Filed: Sep. 27, 1982

[51] Int. Cl.³ .............................................. B01D 23/28
[52] U.S. Cl. ............................... 210/477; 210/DIG. 5
[58] Field of Search ................. 210/DIG. 5, 477, 649, 210/799, 634

[56] References Cited

U.S. PATENT DOCUMENTS

| | | | |
|---|---|---|---|
| 324,080 | 8/1885 | Butterfield | 210/477 |
| 1,107,485 | 8/1914 | Bowser | 210/DIG. 5 |
| 4,371,441 | 2/1983 | Mathes et al. | 210/649 |

*Primary Examiner*—Frank Sever
*Attorney, Agent, or Firm*—William P. Hickey

[57] ABSTRACT

It has long been known that there is an interfacial tension between immiscible liquids such as water in oil. It has long been known that membranes when wetted by one of two immiscible liquids will preferentially allow the passage through the membrane of the liquid with which the membrane is wetted, and will reject the other liquid with an opposing force that is proportional to the interfacial tension of the liquids. The opposing force is inversely proportional to the diameter of the pores of the membrane, and can be several inches of water head for pores a couple thousands of an inch in diameter. According to principles of the present invention, a structure is provided which augments the small water opposing force of the above described phenomenon with opposing forces of other mechanisms to produce a combined force which will separate water, without utilizing dirt collecting and annoying water coalescing filters, such as layers of glass fibers, etc.

18 Claims, 4 Drawing Figures

WATER SHEDDING DEVICE

TECHNICAL FIELD

The present invention relates to a device for keeping agglomerated particles of water that are dispersed in an organic fluid from proceeding with the organic fluid through a straining device; and more particularly to a water shedding funnel.

BACKGROUND OF THE INVENTION

A very extensive problem exists in separating water from organic fluids in which they are not miscible. Practically all commercial fuels are hydrocarbons in which water separates as droplets. Practically all fuel metering systems which control the flow of these fuels to engines, burners, etc. become plugged by water droplets; and therefore either the water must be removed from the fuel or shut downs are experienced when the water reaches the fuel metering systems.

An object of the present invention is the provision of a new and improved filling device for fuel storage systems which when properly used will separate most agglomerated water and let the user know that the fuel was contaminated with water.

The purpose of the above objective is to warn the user of contaminated fuel before the contaminate reaches the fuel metering system. Depending on how the water shedding device has been used, some water may get past the shedder. By being warned of the presence of water, the user may allow the filled storage facility to be drained, or to remain idle for adequate water separation before reaching the fuel metering system, or he may add a chemical agent, such as an alcohol, to disperse the water throughout the fuel in a state which will pass through the fuel metering system.

Another object of the present invention is the provision of a new and improved water shedding device of the above described type which is deviod of a dirt collecting filter, and so can be kept clean and be used over and over again.

A further object of the present invention is the provision of a water shedding device of the above described type in which the water shedding element can be easily and quickly removed from its container for cleaning.

A still further object of the present invention is the provision of a new and improved device of the above described type which is simple in design, rugged in its construction, and efficient in its operation.

Still further objects and advantages of the present invention will become apparent to those skilled in the art to which the invention relates from the following description of several preferred embodiments taken with the accompanying drawings forming a part of this disclosure.

DESCRIPTION OF THE PREFERRED EMBODIMENTS

It has long been known that there is an interfacial tension between immiscible liquids such as water in oil. It has long been known that membranes when wetted by one of two immiscible liquids will preferentially allow the passage through the membrane of the liquid with which the membrane is wetted, and will reject the other liquid with an opposing force that is proportional to the interfacial tension of the liquids. The opposing force is inversely proportional to the diameter of the pores of the membrane, and can be several inches of water head for pores a couple thousands of an inch in diameter. For 100 mesh screens, the opposing force will be less than approximately ½ inch of head of water in a diesel fuel oil. It will therefore be seen that for membranes having large pores, capable of handling large flows therethrough, very little opposing head is generated by the membrane for separating water droplets from the hydrocarbons slowing therethrough.

According to principles of the present invention, a structure is provided which augments the small water opposing force of the above described phenomenon with opposing forces of other mechanisms to produce a combined force which will separate water, without utilizing dirt collecting and annoying water coalescing filters, such as layers of glass fibers, etc.

Figure 1:
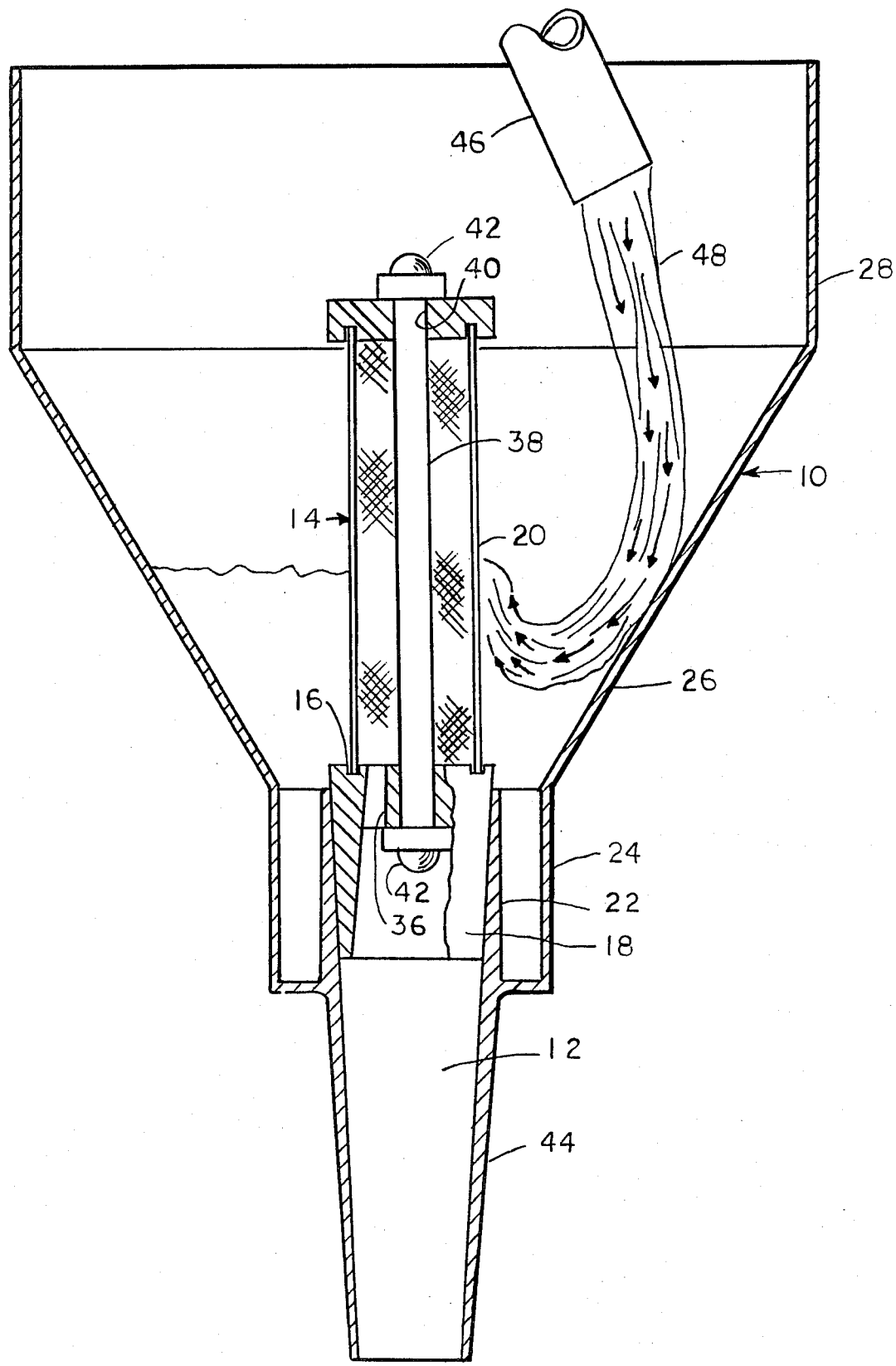
FIG. 1 is a longitudinal cross sectional view of a funnel embodying principles of the present invention.

The device shown in FIG. 1 generally comprises a container 10 having an open top and an outlet 12 at its lower end. A tubular element 14 having an impervious lower tubular base portion 16, preferably made of a hydrophobic plastic, extends up from the opening and is sealed to the container 10 as by taper 18. The center section of the tubular element 14 is made pervious by cylindrical screen 20 through which fluid enters the tubular element 14 and flows out through the outlet 12. The container 10 has an internally tapered boss 22 for receiving the taper 18 of the tubular base portion 16, and opposite the boss 22, the container is stepped outwardly as at 24 to provide a sump for collected water. Immediately upwardly of the sump 24 the sidewalls of the container diverge outwardly to provide a frustroconical funnel section 26 to funnel flow toward the sump 24. Upwardly of the funnel shaped section 26, the container 10 may, or may not, have a generally cylindrical section 28 to help keep liquid that is poured into the container from splashing out of the funnel shaped section. The sections 24 and 28 will preferably have a slight outward taper to allow one container to nest in another for shipping.

The upper end of the tubular element 14 is formed by a plastic cap 30 preferably made of a hydrophobic material for closing off the upper end of the cylindrical screen 20. The lower end of the cap 30 has an annular groove 32 therein into which the upper end of the cylindrical screen 20 projects and the upper end of the tubular base 16 is provided with a similar annular groove 34 to receive the bottom end of the cylindrical screen 20. The tubular base 16 has an internal spider 36 comprising a center boss and three legs supported from the outer tubular walls of the base. The center boss of the spider 36 has an axially extending opening therethrough to receive the bottom end of a nylon rod 38. The top end of the nylon rod 38 projects out of the cap 30 through an axially extending opening 40, and the base 16, screen 20 and cap 30 are held clamped together by a pair of pal nuts 42 that are pressed onto opposite ends of the rod 38. The nylon rod 38 has a clearance of a few thousands of an inch with the sidewalls of the opening 40 and both the cap and rod are hydrophobic so that the opposition to flow of water through the clearance is greater than the possible head between the cap and the open top of the container 10. The same is true between the cap 30 and screen 20, the screen 20 and base 16, and the base 16 and the boss 22. The container 10 has a tubular spout 44 surrounding the opening 12 to conduct effluent into containers to be filled with clean fuel.

The water shedder is used by pouring organic liquids containing water droplets into the container 10 as from a nozzle 46. The stream of liquid impinges upon the sides of the container 10 and flows down the tapered walls 26 toward the sump 24. Because there is no outlet from the sump 24, and the only outlet is through the screen 20, the stream 48 must change direction by at least approximately 90 degrees off of the sidewalls 26. Because the water droplets are heavier than the hydrocarbons, the change in direction throws the water droplets outwardly and downwardly out of the stream 48 in the direction of the sump 24. From this point on, the stream 48 will have an upward component as it spreads out over the screen 20 to help any entrained droplets to meet and coalesce in the vacinity of the hydrophobic openings through the screen 20. At least the sump 24 of the container 10 and preferably the whole container is made of a transparent or translucent hydrophobic plastic, so that any accumulation of water in the container is apparent from the outside of the container.

It is intended that the container will be used as a filling funnel for fuel tanks and the like and that when a water oil interface is seen through the side of the sump section 24, steps will be taken to inventigate the presence of water in the tank that was filled. Either the tank that was filled can be drained before use, or an alcohol, or other agent can be added to dissolve the water in the fuel. It is always possible that some water can get past the membrane by reason of impingement or excessive static head of water against the membrane. Preferably the membrane will in and of itself be hydrophobic, so that it need not be wetted by pure oil before it becomes hydrophobic. A preferred membrane material is a metal screen coated with polytetrafluoroethylene or similar hydrophobic coating. Preferably, the screen should have openings no larger than that of a 100 mesh screen (U.S. Sieve Series).

Figure 2:
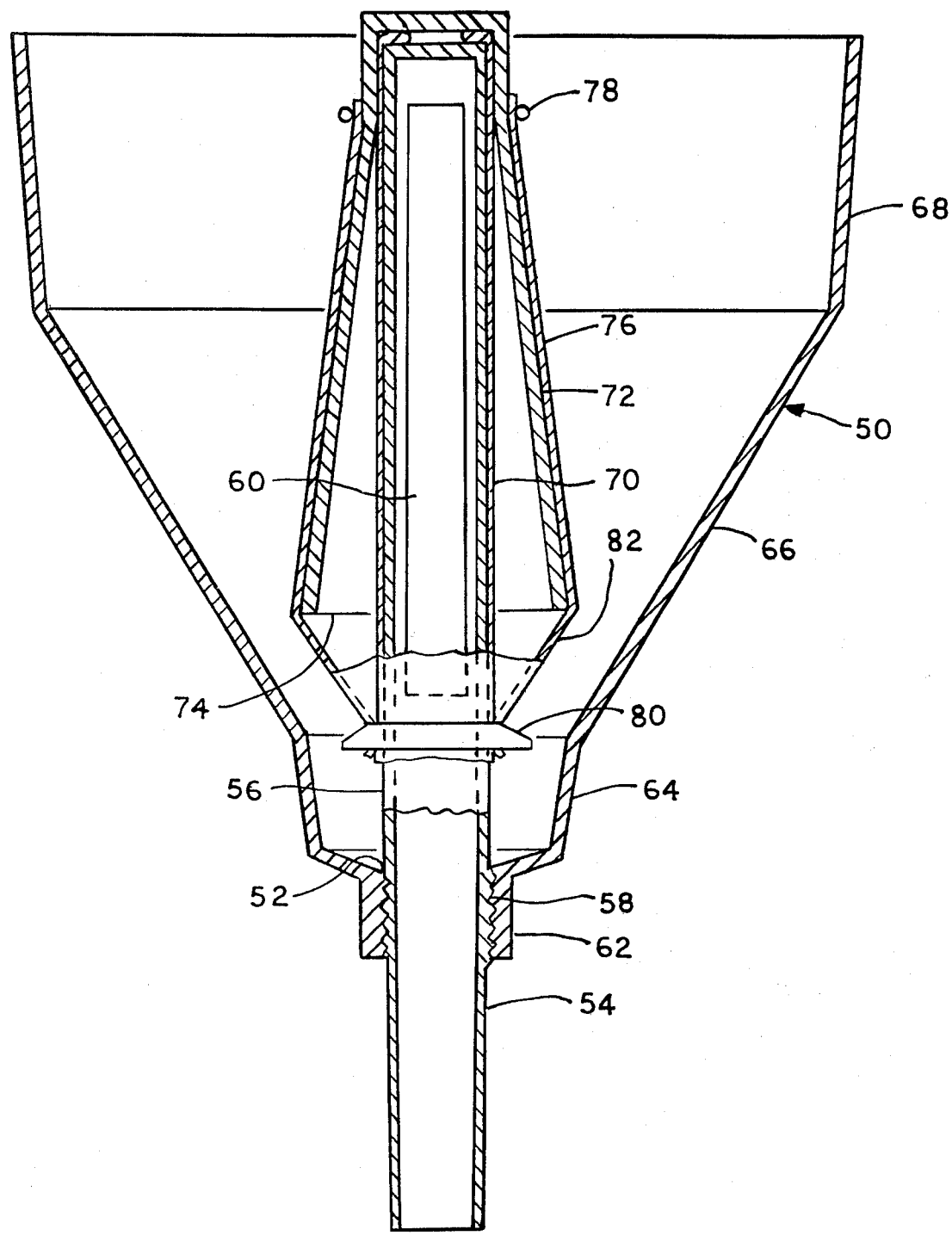
FIG. 2 is a longitudinal cross sectional view of another funnel embodying principles of the present invention.

The device shown in FIG. 2 generally comprises a container 50 having an open top and an outlet 52 at its lower end. A tube 54 having an impervious lower portion 56 extends through the opening and is sealed to the container 50 as by tapered pipe threads 58. The top end of the tube 54 is made pervious by longitudinally extending openings 60 through which fluid enters the tube 54 and flows through the tube out of the container 50. The container 50 has an internally threaded boss 62 for receiving the pipe threads 58, and immediately upwardly of the boss 62, the container is stepped outwardly as at 64 to provide a sump for collected water. Immediately upwardly of the sump 64, the sidewalls of the container diverge outwardly to provide a frustroconical funnel section 66 to funnel flow toward the sump 64. Upwardly of the funnel shaped section 66, the container 50 may, or may not, have a generally cylindrical section 68 to help keep liquid that is poured into the container from splashing out of the funnel shaped section. The sections 64 and 68 will preferably have a slight outward taper to allow one container to nest in another for shipping.

In some instances a pervious membrane 70 can be wrapped over the upper pervious end 60 of the tube 54 to provide an opposing force for water droplets that would be in a liquid contacting the membrane. In the embodiment shown, a shield 72 is provided to keep the water droplets from impinging directly onto the membrane 70. The shield 72 that is shown, is a generally conically shaped sleeve or tube having a closed upper end which fits tightly onto the upper end of the tube 54 and an open bottom end 74. The shield 72 may also be covered with a membrane 76 that is held onto the top of the shield by a tightly fitting elastomeric band 78. The membrane 76 is clamped around the impervious portion 56 of the tube 54 by an elastomeric ring 80 that is in the form of a shield to prevent water in the sump 64 from being splashed upwardly by liquid that is poured into the container. The portion 82 of the membrane 76 that extends between the shield 72 and the shield 80 is tapered and is generally parallel to the walls of the funnel section 66 so that liquid flowing through the container will flow down the walls 66 in a direction generally parallel to the membrane. Water droplets in this flow will usually be heavier than the diesel fuel so that gravity, and the kinetic energy of the droplets combine to provide a force on the droplets in a direction away from the membrane 82—thus helping the opposing force of the pores of the membrane to keep the water droplets from entering the membrane 82. Thus gravity and the kinetic energy of the droplets help carry the water droplets down into the sump 64. Only one or the other of the membranes 70 and 82 need be used, and when only one is used, the membrane 70 is preferred. At least the walls of the sump section 64 of the container is made of a translucent material through which a water-oil interface can be seen; so that the presence of water can be noted before the interface builds up to where it stands against the membrane high enough to enter the openings 60.

It will be seen that when contaminated fuel is poured into the container 50, the kinetic energy of water droplets therein will cause the drops to approach the membrane 70 or 82 as the case may be, in a direction generally parallel thereto; and that because the flow of fuel is upward through the membrane, gravity on the water drops combines with the opposing hydrophobic effect of the pores to separate the water droplets from the fuel. Since the fuel does almost a 180 degree change in direction as it passes through the membrane, a centrifugal force is exerted on the water droplets before they can reach the membrane.

Figure 3:
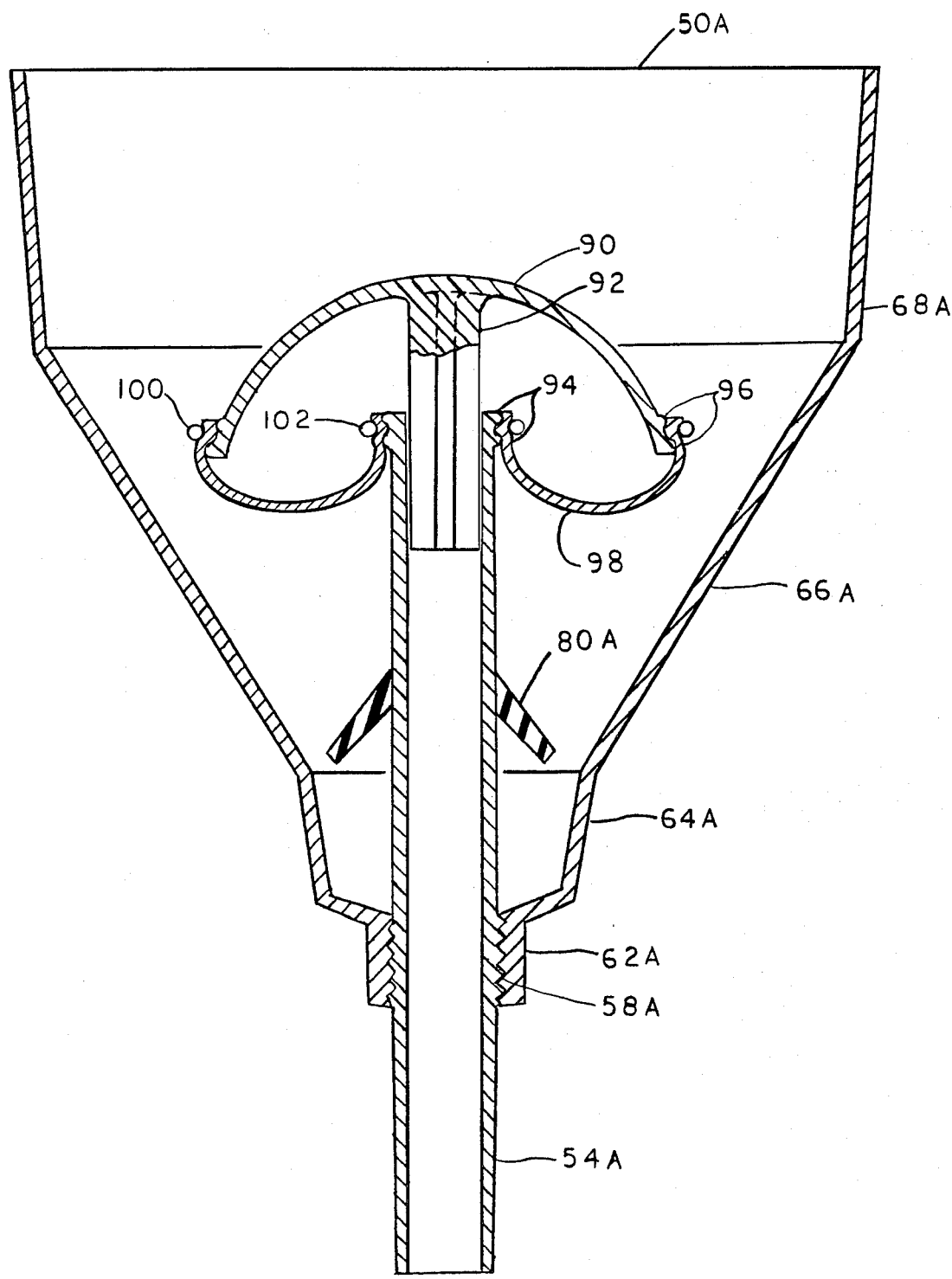
FIG. 3 is a longitudinal cross sectional view of a third embodiment of the invention.

The embodiment shown in FIG. 3 is generally similar to the embodiment previously described, but differs principally therefrom in the construction of the outlet tube and shield. Those portions of the embodiment shown in FIG. 3 which correspond to similar portions of the embodiment shown in FIG. 2 are designated by a like reference numeral characterized further in that a suffix "a" is affixed thereto.

In the embodiment shown in FIG. 3, the perforate portion 56a of the tube is formed by the open end of the tube 54a into which flow enters unhampered from all directions. The shield 90 is dome shaped, and is supported by a pedestal 92 that is intergral with the dome which fits down into the open end of the tube 54a. The pedestal 92, shown, has a cross section that is in the shape of a cross, but can be of any configuration which does not hinder flow into the tube 54a. The upper end of the tube 54a has a pair of spaced apart parallel hose barbs, or ridges 94. The bottom outside surface of the dome shield 90 also has a pair of hose barbs 96. A generally hemi-torus shaped membrane 98 extends between the hose barbs 94 and 96, and is held in place by O-rings 100 and 102 which clamp the outer and inner edges of the membrane between the barbs 96 and 94, respectively.

It will be seen that liquids that are poured into the container 50a will be deflected by the dome 90 against the sloping sides 66a, and that the portion of the membrane 98 that is fixed to the shield 90 is generally parallel to the flow passing between the membrane 98 and the sloping sides 66a. Since the only way out of the container for fluid is upwardly through the membrane 98, oils in the container will gradually change their direction to flow upwardly through the membrane. In diesel fuel, for example, water droplets are heavier than the oil; so that centrifugal force on water droplets trying to follow the flow of oil, biases the water droplets downwardly. This force in combination with the hydrophobic force of the membrane causes fine droplets to be held in the region below the membrane and adjacent the tube 54a where they coalesce and drop down the sides of the tube into the sump 64a below. Any large bodies of water will flow down the sloping sides 66a and will slide under the splash gaurd 80a.

Figure 4:
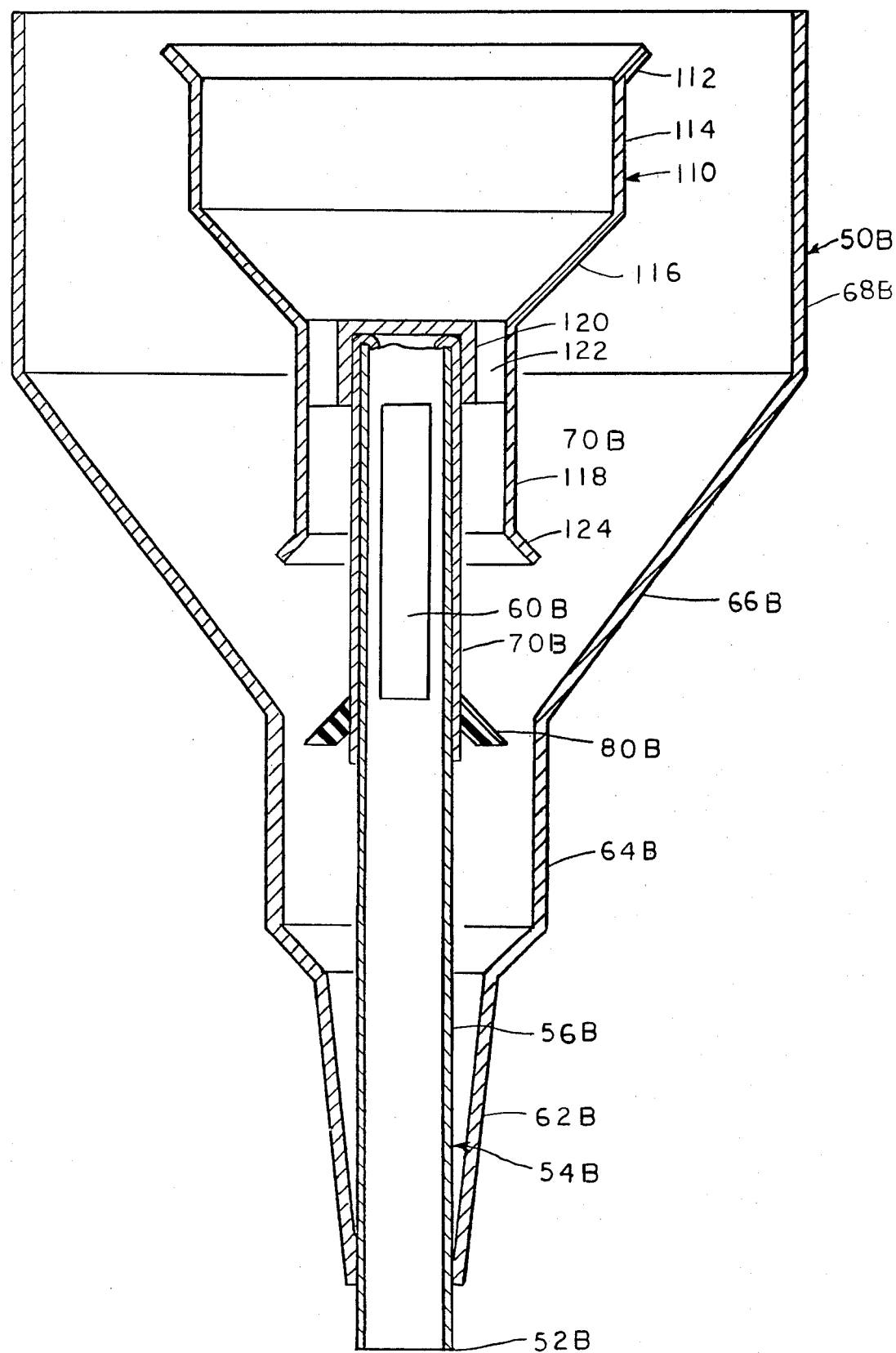
FIG. 4 is a longitudinal cross sectional view of a fourth embodiment of the invention.

The embodiment shown in FIG. 4 is somewhat similar to the embodiment shown in FIG. 2, but differs principally therefrom in that it contains an inner funnel which causes flow to proceed downwardly parallel to the hydrophobic membrane with such an entrance condition and velocity that not enough lateral head exists on the water droplets to force them through the membrane. The entrance conditions tend to move the water droplets to the center of the stream; downward velocity and the hydrophobic nature of the screen keeps them from passing through the screen; and the diverging end provides a laterally outward component. The water droplets then move to the sump and the organic liquid turns approximately 180 degrees and moves upwardly into the container 50b. Those portions of the embodiments shown in FIG. 4 which are similar to corresponding portions of FIG. 2 are designated by a like reference numeral characterized further in that a suffix "b" is affixed thereto.

The inner funnel 110 has a converging top section 112, a generally cylindrical body section 114, a bottom converging section 116, and a tubular section 118 which surrounds the top of the tubular element 54b. The funnel 110 has a downwardly facing cap 120 which fits over the top of the tube 54b and which is spaced from the tubular section 118 by three ribs 122. The top end of the cylindrical membrane 70b fits up under the cap 120, and the bottom end of the cylindrical membrane 70b is held over the imperforate lower end 56b of the tube 54b by the shield 80b.

It will now be seen that there has been provided a filling device which can be made in any size suitable for handling the flow to any size storage tank. The device separates water from liquid in which it is immiscible and accumulates the water to form an interface which can be easily seen to warn the user of the presence of contaminating water. The device preferably combines the effect of a hydrophobic membrane with gravity, and or centrifugal force to provide separation with a minimum of back pressure, and so can be incorporated in open top containers such as funnels.

While the invention has been described in considerable detail, I do not wish to be limited to the particular embodiments shown and described; and it is my intention to cover hereby, all novel adaptations, modifications and arrangements thereof which come within the practice of those skilled in the art to which the invention relates, and which fall within the purview of the following claims.

I claim:

1. In a container having container side walls and a drain opening therethrough from which fluid flows by gravity: a generally tubular boss sealed to said walls around said drain opening and projecting generally vertically into said container; a pervious enclosure in said container rising vertically and sealed to said boss, said pervious enclosure having openings therethrough which communicate the inside of said container to the inside of said enclosure, said openings being no larger than about 100 mesh and being surrounded by a hydrophobic material which opposes water from entering said enclosure from said container, said walls of said container being shaped to provide a sump surrounding said boss, and being further constructed and arranged so that flow along said container walls proceeds toward said sump and then passes over said sump and reverses direction toward said pervious enclosure before proceeding downwardly and out of said drain opening, and means for visually detecting water between said boss and side walls of said container.

2. The container of claim 1 wherein: said pervious enclosure includes an impervious lower end made of a hydrophobic material which sheds water; and means forming a connection between said hydrophobic material and said boss of said container.

3. The container of claim 2 wherein: said means is a sliding taper that is generally coaxial with the drain opening in said walls of said container and by means of which said impervious lower end of said enclosure can be released from said boss from the outside of said container.

4. The container of claim 2 wherein: said enclosure also contains an end cap opposite said impervious lower end and said pervious portion of said enclosure is a hydrophobic screen clamped between said cap and said impervious lower end.

5. A water shedding device, comprising: a container having a drain outlet at the end of the container from which liquid drains by gravity; an impervious tube projecting upwardly into said container from said drain outlet and making a seal with the container surrounding the drain outlet, said impervious tube forming a sump with the sidewalls of said container from which liquid can not flow out of said drain outlet; and a hydrophobic pervious material having a lower portion secured to said impervious tube and an upper portion forming a water separator for fluid entering said impervious tube; and means for visually sensing water between said impervious tube and the sidewalls of said container.

6. The device of claim 5 having a shield for said pervious tube, said shield having a closed top, sidewalls that extend around the pervious tube; and a fluid entrance at the bottom to permit fluid to rise up in the shield and contact said pervious tube.

7. The device of claims 5 or 6 having a generally cylindrical section opposite said impervious tube forming a water sump.

8. The device of claim 5 wherein said impervious tube is detachably mounted to said container.

9. The device of claim 5 wherein said impervious tube is threaded to said container.

10. A water shedding funnel, comprising: a container having a generally V-shaped cross section with an outlet at the lower end of the container; a tube projecting through said outlet into said container and effecting a seal with said container, said tube having a pervious portion in said container and an impervious portion between said pervious portion and said seal and forming a sump between said impervious portion and the sidewalls of said container; said pervious portion being hydrophobic and shedding water into the lower end of the container while permitting hydrocarbons to enter said tube; and means for visually sensing water between said impervious portion of said tube and the sidewalls of said container.

11. The funnel of claim 10 wherein said tube is threaded to said container and is removable.

12. The funnel of claim 10 wherein said container has a portion upwardly of said outlet having less taper than the remaining sidewalls of said container to form said sump.

13. The funnel of claim 12 wherein said outlet of said funnel is a threaded boss, and said tube has external threads which are threaded into said threaded boss.

14. The funnel of claim 13 wherein said boss has an outside diameter less than the inside diameter of said sump and the top of said container is open so that one container can nest in another.

15. The funnel of claim 14 including: a shield having a closed upper end resting on the upper end of said tube and outwardly diverging sides giving fluid flow clearance with said pervious hydrophobic portion of said tube.

16. The funnel of claim 15 wherein the diverging sides of said shield when extended intersect the V-shaped surface of said container.

17. A water shedding assembly comprising: a tube having three distinct sections including a lower end impervious section with sealing means for effecting a seal with its external periphery, a middle impervious section projecting upwardly from said lower end sealing means for keeping a level of liquid external and above said sealing means, and an upper pervious section through which fluid must enter the inside of said tube, said pervious section having openings of no greater than about 100 mesh and being of a hydrophobic material: and said lower end impervious section being of a hydrophobic material to keep water from getting past said means for effecting a seal with its periphery.

18. The water shedding assembly of claim 17 wherein: said means comprises an external taper on said tube and whereby said assembly will effect a water seal when wedged into surrounding fluid containing structure.

* * * * *